3,396,123
METHOD OF PREPARING A CATALYST COMPOSITE
Peter Urban, Northbrook, Ill., assignor to Universal Oil Products Company, Des Plaines, Ill., a corporation of Delaware
No Drawing. Filed Dec. 22, 1965, Ser. No. 515,743
5 Claims. (Cl. 252—428)

ABSTRACT OF THE DISCLOSURE

A catalyst composite containing a thermoplastic and an inorganic carrier material is prepared by admixing a powdered plastic, such as polyethylene, polypropylene, polystyrene, etc. with finely divided particles of carbon, silica, clays, silicates and the like, heating the mixture to the softening point of the thermoplastic to form a plastic cake after cooling. The cake is broken into granules and impregnated with a catalytic material.

---

This application relates to a novel catalyst composite of the type referred to in the art as solid catalyst. The solid catalyst comprises a solid carrying or supporting material impregnated with an active catalytic material. The intimate association of these two components produces a catalyst composite of higher activity.

Improved results are obtained when the catalyst composite is in finely divided condition. The small particles offer advantages in (1) more surface available for contact of the reactants with the catalyst, and (2) more efficient utilization of the catalytic material. However, a serious disadvantage of the finely divided catalyst particles is that the small particles tend to be carried out of the system in the products of the process. Another disadvantage to the use of the finely divided particles in a fixed bed operation is the high pressure drop encountered in the process. The present invention offers a novel method of retaining the important advantages as set forth above without the objection of loss of catalyst particles in the products of the process.

The difficulties mentioned above may be illustrated, for example, in a process in which finely divided carbon is utilized as a carrier for a catalytic material in the sweetening of a sour hydrocarbon distillate. A recently developed catalytic material of high potency is cobalt phthalocyanine sulfonate. However, when this catalyst composite is used, either as a fixed bed in a reaction zone or in a slurry or suspensoid type operation, the finely divided catalyst composite particles become suspended in the hydrocarbon distillate and are lost from the process. This has the dual disadvantages of catalyst loss and of contamination of the distillate with the catalyst particles. The finely divided particles can, of course, be separated from the hydrocarbon distillate but this would entail additional filtering, centrifuging or other separating means which increases the cost of the process, both for equipment and manpower.

The novel catalyst composite of the present invention comprises plastic particles, solid carrier particles distributed thereon, and a catalytic material impregnated on said carrier particles.

In a preferred embodiment the catalyst composite is prepared by warming plastic to the softening point, intimately admixing therewith finely divided particles of a solid carrier and thereafter impregnating said carrier with a catalytic material.

From the above description it will be seen that the novel catalyst composite is prepared by first admixing particles of solid carrier with the plastic and then impregnating with the catalytic material. As hereinbefore set forth the use of finely divided catalyst particles offers the advantage of providing greater catalyst surface for contact with the reactants. The novel method of the present invention further increases the available surface and, as will be shown in the appended example, results in a smaller requirement of catalyst to accomplish the desired conversion.

The catalyst must be prepared by first compositing the carrier with the plastic and then impregnating with the catalytic material. The catalytic material can not be composited directly with the plastic because the catalyst will become imbedded within the plastic and would not be exposed for contact with the reactants. Therefore it is essential that this particular sequence of steps be utilized in preparing the catalyst composite.

Any suitable plastic is used in preparing the catalyst composite of the present invention. The plastic must be of the thermoplastic type; that is, it must soften upon heating. There is a large variety of thermoplastics available in the market and the specific plastic for use in the present invention will be selected with regard to its resistance to the reagents and solvents, when employed, which are used in preparing the catalyst and to the reactants used in the process, as well as the thermoplastic properties of the plastic. For example, some plastics are more resistant to acid, alkalies or organic solvents than other plastics, and the specific plastic, therefore, will be selected with regard to the particular catalyst and to the process in which it is to be employed.

A preferred plastic for use in the present invention is solid polyolefin, including particularly polyethylene and polypropylene. Other polyolefins include ethylene-propylene polymers, ethylene-butylene polymers, propylene-butylene polymers or solid polymers prepared from higher molecular weight olefins or mixtures thereof and/or mixtures thereof with ethylene, propylene and/or butylene. The solid polyolefins in general are resistant to weak acids and weak or strong alkalies. These polyolefins also are resistant to most organic solvents at moderate temperatures.

Other thermoplastics include polystyrene, polycarbonates, polyurethanes, phenoxy resins, ets. Still another class of thermoplastics are broadly classified as vinyl resins and are derived from monomers such as vinyl chloride, vinyl acetate, vinylidine chloride, etc. They include polyvinyl chloride, copolymers of vinylchloride with one or more of acrylonitrile, methacrylonitrile, vinylidine chloride, alkyl acrylate, alkyl methacrylate, alkyl maleate, alkyl fumarate, etc. Still another class of thermoplastics is of the fluorocarbon type and include polychloro-trifluoroethylene, polychloro-tetrafluoroethylene, etc. As hereinbefore set forth these thermoplastics are available commercially and will be selected with reference to their resistance to the reagents, solvents or reactants used in the manufacture of the catalyst composite or in the reactants being processed, as well as the thermoplastic properties of the plastic.

In the preparation of the catalyst composite, the plastic is warmed to softening. This will vary with the particular plastic employed and generally will range from a temperature of about 200° to about 300° F. or in some cases up to 400° F. or more. The exact temperature of heating is not critical but must be sufficient to accomplish softening of the plastic but below that at which decomposition or other undesired conversion of the plastics occurs. In some cases the plastic is available in the form of pellets and the heating can be controlled to soften the outer surface of the pellets while leaving the inside of the pellets hard. This method of controlled heating is preferred because it will prevent the carrier material from being imbedded in the plastic.

While the plastic is in the softened condition, finely divided particles of the carrier material are admixed therewith. Any suitable finely divided carrier material is utilized in preparing the catalyst composite of the present invention. The carrier material will be selected with reference to its suitability for the particular process in which the catalyst is to be employed. For example, as hereinbefore set forth, a particularly suitable carrier material for use in a process for sweetening of sour hydrocarbon distillates is finely divided carbon. Any suitable carbon is utilized activated carbon being particularly preferred. Other carbons include coke, charcoal, which may be obtained from any suitable source including bone char, wood charcoal, charcoal made from cocoanut or other nut shells, fruit pits, etc. Other carriers include silica as, for example, sand, glass beads, etc., clays and silicates including those synthetically prepared or naturally occurring, preferably acid, heat or otherwise treated, as for example, attapulgus clay, china clay, diatomaceous earth, feldspar, fuller's earth, halloysite, kaolin, kieselguhr, mica, montmorillonite, pumice, etc., aluminas and particularly alpha aluminas including corundum, emery, etc., ceramics, porcelain, various magnesium compounds, etc.

The above carriers are particularly useful in the preparation of catalysts for the sweetening of sour hydrocarbon distillates. In another embodiment the solid carrier may comprise silica-alumina, magnesia, silica-magnesia, zirconia, silica-zirconia, alumina-zirconia, titania, silica-titania, alumina-titania, hafnia, lumina-hafnia, silica-hafnia, etc., as well as various combinations of these and other carrier materials. Here again the carrier material will be selected with reference to the other components of the catalyst composite in order to prepare a catalyst of high activity for the desired purpose.

The carrier material is prepared in finely divided condition and this may be accomplished in any suitable manner including grinding, chopping, pulverizing, etc., or in the methods referred to in the art as spray drying, oil drop method, etc. Thus, the finely divided particles may be of regular or irregular size and shape including spheres, pills, pellets, flakes, powder, etc.

The finely divided carrier particles are admixed with the soft plastic in any suitable manner. Conveniently this is accomplished by gradually adding the carrier particles to the plastic and stirring the mixture with mixing paddles or the like. In another embodiment, the plastic may be rotated while the finely divided carrier particles are dropped thereon. It is apparent that any suitable method of attaching the finely divided carrier material to the plastic may be employed.

Following the admixing of the carrier material with the plastic, the mixture is dried in any suitable manner. This may include air cooling to room temperature, passing hot gas over the mixture, drying in a furnace or in any other suitable manner. Due to the tackiness of the softened plastic, a cake may be formed during the mixing step. When this occurs the cake is broken into particles of the desired size and shape in any suitable manner.

The mixture of carrier material and plastic prepared in the above manner is now ready for impregnation with the catalytic material. This may be accomplished in any suitable manner and will depend upon the particular catalytic material to be incorporated in the catalyst composite. For example, when the catalytic material is cobalt phthalocyanine sulfonate, a solution and/or suspension of the sulfonate is prepared in a suitable solvent and the particles of carrier material-plastic are contacted with the suspension and/or solution in any suitable manner. In one method the particles are soaked, dipped, suspended or immersed, etc. in the suspension. In another method the suspension is sprayed onto, poured over or otherwise contacted with the particles. Excess suspension is removed in any suitable manner and the composite may be allowed to dry at room temperature, dried in an oven or by means of hot gases passed thereover or in any other suitable manner.

When used in sweetening reactions, a phthalocyanine catalyst is preferred. Any suitable phthalocyanine catalyst may be used and preferably comprises a metal phthalocyanine. Particularly preferred metal phthalocyanines comprise cobalt phthalocyanine and vanadium phthalocyanine. Other phthalocyanines include copper phthalocyanine, magnesium phthalocyanine, zinc phthalocyanine, titanium phthalocyanine, hafnium phthalocyanine, thorium phthalocyanine, tin phthalocyanine, chromium phthalocyanine, nickel phthalocyanine, iron phthalocyanine, palladium phthalocyanine, platinum phthalocyanine, silver phthalocyanine, etc. Still more preferably the metal phthalocyanine catalyst is utilized as a derivative thereof. A particularly preferred derivative is the sulfonated derivative. Thus, a particularly preferred phthalocyanine catalyst comprises cobalt phthalocyanine sulfonate. A preferred catalyst comprises cobalt phthalocyanine disulfonate, which also may contain the monosulfonate. Another preferred catalyst comprises vanadium phthalocyanine sulfonate. These compounds may be obtained from any suitable source or may be prepared in any suitable manner as, for example, by reacting cobalt, vanadium or other metal phthalocyanine with fuming sulfuric acid. While the sulfonic acids are particularly preferred, it is understood that other suitable derivatives may be employed. Other derivatives which may be prepared, for example, by the action of trichloroacetic acid on the metal phthalocyanine or by the action of phosgene and aluminum chloride. In the latter reaction, the acid chloride is formed and may be converted to the desired carboxylated derivative by conventional hydrolysis.

In forming the solution and/or suspension of the phthalocyanine catalyst, a non-aqueous suspension and/or solution is preferred and particularly a solution and/or suspension in alcohol, including methanol, ethanol, propanol, butanol, etc., ammonia or other alkaline compounds. When using alcohol it appears that part of the catalyst is in solution and part in suspension. In some cases, an aqueous suspension may be used and preferably an aqueous solution containing alcohol, ammonium hydroxide, etc.

The carrier material-plastic particles also are used in the preparation of other catalyst composites. The catalytic material in these other composites generally will be selected from Groups I, IV, V, VI and VIII of the Periodic Table. Preferred catalytic materials are the oxides or other derivatives of copper, silver, gold, zinc, vanadium, columbium, tantalum, chromium, molybdenum, tungsten, manganese, rhenium, iron, cobalt, ruthenium, rhodium, palladium, osmium, iridium and platinum. It is understood that the catalytic material will be chemically different from the carrier material. Impregnation of the carrier material is effected in any suitable manner and either by utilizing an acidic salt and neutralizing with an alkaline reagent or utilizing an alkaline salt and neutralizing with an acidic reagent. These methods are well-known in the art and need not be described in detail herein.

The catalyst prepared in the above manner is utilized in any process for the conversion or treating of organic substrates. As hereinbefore set forth, the composite of phthalocyanine, carbon and plastic is particularly suitable for use in the sweetening of sour hydrocrabon distillates, which distillates include gasoline, naphtha, kerosene, fuel oil, furnace oil, diesel oil, etc. In another embodiment hydrocarbon gases, including methane, ethane, propane, butane and/or ethylene, propylene, butylene or mixtures thereof, may contain mercaptans and may be sweetened to convert the mercaptans to disulfides. The above examples comprise those in which the mercaptans are present in relatively small concentrations. The catalyst also may be used in the conversion of a mercaptan fraction consisting primarily of mercaptans or containing the mercaptans in a relatively high concentration. In still another embodiment mercaptans may be contained in order organic substrates.

The phthalocyanine catalyst also is used in the regeneration of caustic or other alkaline solution used to extract mercaptans from an organic substrate and particularly hydrocarbons. In this process the hydrocarbon stream is passed into contact with the caustic (sodium hydroxide) solution to form sodium mercaptides which are soluble in the caustic solution and thereby are separated from the hydrocarbon fraction. The caustic solution containing the mercaptides then is oxidized in the presence of the phthalocyanine catalyst to convert the mercaptans to disulfides and to regenerate the caustic solution for reuse.

In the above process conversion of mercaptans is effected by oxidation. Accordingly air oxygen or other oxygen containing gas is utilized in the reaction. The process may be effected in either countercurrent or concurrent passing of the charge stream, air and, when employed, caustic solution. The oxidation is effected at a mild temperature, which may range from ambient up to about 300° F. or more and particularly from about 75° to about 150° F. Atmospheric pressure generally is employed, although superatmospheric pressure up to 1000 pounds per square inch or more may be employed if desired. The time of contact may range from 0.5 to 48 hours or more.

The catalyst composite of catalytic material, solid carrier and plastic may be used as a fixed bed in a reaction zone or the catalyst composite may be suspended in one or more of the reactant or solvent streams and carried in this manner into the reaction zone. In the latter operation the catalyst composite is separated from the reaction product in any suitable manner including settling, centrifuging, etc. As hereinbefore set forth, it is an important feature of the present invention that the catalyst composite separates readily from the reaction product and avoids the loss of catalyst encountered in the prior methods.

As hereinbefore set forth the catalyst composite of the present invention may be used in any conversion or treating process which is effected at a temperature below that at which the plastic decomposes. In general this means that the catalyst composite may be used in any process utilizing temperatures of below about 500° F. and preferably of below about 400° F. Thus the catalyst may be used for reactions including oxidation, alkylation, polymerization, condensation, hydrogenation, isomerization, etc., as well as a packed bed for the purification of gases or distillates containing undesired impurities.

The following examples are used to illustrate further the novelty and utility of the present invention but not with the intention of unduly limiting the same.

EXAMPLE I

The catalyst of this example is a composite of polyethylene, activated carbon and cobalt phthalocyanine sulfonate. It was prepared by grinding 5 g. of activated carbon to pass through a 50 mesh (U.S.) screen. The ground carbon particles were mixed with 140 g. of high density polyethylene powder. The polyethylene powder is available commercially under the tradename of "Fortiflex." The mixture was heated to 230–250° F. for one hour. At the end of this time the plastic had softened. The mixture was turned over several times using a spatula. The carbon adhered to the plastic. It was noted that the particles were soft on the outside but solid on the inside. Upon cooling a plastic cake had formed, which cake was readily broken into small hard granules.

A suspension of cobalt phthalocyanine sulfonate powder in anhydrous methanol was prepared. The carbon-plastic granules were soaked in this mixed solution-suspension, excess liquid was drained off and the composite was dried. It was found that the composite contained 1% by weight of cobalt phthalocyanine sulfonate.

EXAMPLE II

The catalyst prepared as described in Example I was utilized for the sweetening of sour commercial kerosene containing 493 parts per million of mercaptan sulfur. The catalyst composite was used in a volume of 100 cc. as a fixed bed in a reaction zone, the catalyst composite consisting of 140 g. of polyethylene, 5 g. of activated carbon and 0.05 g. of cobalt phthalocyanine sulfonate. The catalyst composite was wetted by 8% sodium hydroxide aqueous solution. The kerosene at a rate of 200 cc. per hour and air at a rate of about 180 cc. per hour were passed upwardly through the catalyst bed at room temperature. The product was recovered in separate batches and each batch was analyzed for mercaptan sulfur. The first batch comprised 100 cc. of product and was found to contain only 17.5 parts per million of mercaptan sulfur. The sixth batch comprising 225 cc. of product (total of 890 cc. of product being obtained) had a mercaptan sulfur content of 36 parts per million.

From the above data it will be seen that the catalyst composite was effective for the sweetening of the sour kerosene.

EXAMPLE III

In order to compare the results obtained when using the catalyst composite of Example III with a comparable catalyst not containing the plastic, another run was made under substantially the same conditions as described in Example II except that the catalyst comprises 15.2 g. of the activated carbon and 0.15 g. of cobalt phthalocyanine sulfonate. It will be noted that this catalyst contained 3 times the quantity of activated carbon and of cobalt phthalocyamine than the catalyst used in Example II.

When used for the sweetening of another batch of the sour commercial kerosene, the mercaptan sulfur content of the first batch of 100 cc. of product was 17.5 parts per million. The sixth batch of product after about 900 cc. of product was obtained had a mercaptan sulfur content of 30 parts per million.

In comparing the results obtained in the above run with the results obtained in Example II, it will be noted that the reduction in mercaptan content was only slightly better in the run of Example III but that this run utilized 3 times the amount of activated carbon compared to the catalyst composite used in the run of Example II.

EXAMPLE IV

A number of runs was made for the sweetening of sour hydrocarbon distillate using the catalyst composite prepared as described in Example I. The catalyst composite in these runs was used as a slurry in the hydrocarbon distillate, which was passed, together was caustic solution and air, into a reaction zone. The total reactor effluent was passed into a settling zone to separate hydrocarbon distillate from the catalyst slurry. It was found that a clean separation occurred and that the hydrocarbon distillate product was substantially free of entrained catalyst particles.

In contrast to the above, in similar runs using the catalyst described in Example III in a slurry operation, it was found that the treated hydrocarbon distillate contained catalyst particles. As hereinbefore set forth this is a serious objection from both the viewpoint of catalyst loss and contamination of the treated product with catalyst particles.

EXAMPLE V

The catalyst of this example is prepared by adding lithium nitrate to alumina spheres and calcining the resultant spheres at a temperature of about 1000° F. The concentration of components are selected to form a composite containing 0.5% by weight of lithium based on the alumina. The promoted alumina spheres then are admixed with solid polypropylene and heated to a temperature of 250° F. with mild stirring. The resultant mixture is dried and ground into powder.

A potassium amide solution is prepared by condensing 300 cc. of ammonia in a flask and adding potassium thereto in small increments while the flask is maintained at the reflux temperature of the ammonia. After all of the potassium dissolves, a sufficient amout of the potassium amide in the liquid ammonia solution is poured over the promoted alumina-plastic powder in a concentration to form a final catalyst containing 20% by weight of potassium amide based upon the promoted alumina. The mixture is allowed to rotate until the ammonia is evaporated and removed. The catalyst mixture then is flushed with dry nitrogen.

The potassium amide-lithium nitrate catalyst prepared in the above manner is utilized as a fixed bed catalyst for the polymerization of propylene to prepare propylene dimer. The polymerization is effected at a temperature of 260° F., a pressure of 120 atmospheres and a liquid hour space velocity of 2.

I claim as my invention:

1. A method of preparing a catalyst composite in finely divided form which comprises mixing finely divided particles of a solid inorganic carrier material with a powdered thermoplastic, heating the mixture to the softening point of the thermoplastic powder, cooling the heated mixture to form a plastic cake, breaking said cake into small hard granules, and thereafter impregnating said granules with a catalytic material.

2. The method of claim 1 further characterized in that said carrier particles are carbon particles.

3. The method of claim 1 further characterized in that said carrier particles are activated carbon and that said catalytic material is a metal phthalocyanine.

4. The method of claim 1 further characterized in that said plastic is polyethylene, said carrier particles are activated carbon particles and said catalytic material is cobalt phthalocyanine sulfonate.

5. The method of claim 3 further characterized in that said metal phthalocyanine is vanadium phthalocyanine sulfonate.

References Cited
UNITED STATES PATENTS

| | | | |
|---|---|---|---|
| 2,478,194 | 8/1949 | Houdry | 252—477 |
| 2,479,451 | 8/1949 | Young | 252—477 |
| 2,727,023 | 12/1955 | Evering et al. | 252—477 |
| 2,929,792 | 3/1960 | Arnold et al. | 252—448 |
| 3,108,081 | 10/1963 | Gleim et al. | 252—428 |
| 3,231,520 | 1/1966 | Leak et al. | 252—477 |
| 3,248,339 | 4/1966 | Spes et al. | 252—477 |
| 3,271,322 | 9/1966 | Stiles | 252—428 |

DELBERT E. GANTZ, *Primary Examiner.*

G. J. CRASANAKIS, *Assistant Examiner.*